(12) United States Patent
Ohnishi et al.

(10) Patent No.: US 7,672,741 B2
(45) Date of Patent: Mar. 2, 2010

(54) POSITION/FORCE CONTROL DEVICE

(75) Inventors: Kouhei Ohnishi, Yokohama (JP);
Masaki Kitajima, Shinanomachi (JP);
Yasuhide Morikawa, Tokyo (JP); Souji Ozawa, Tokyo (JP); Toshiharu Furukawa, Shinanomachi (JP);
Toshiyuki Murakami, Yokohama (JP);
Kazuo Nakazawa, Yokohama (JP);
Wataru Iida, Yokohama (JP); Tomoko Yano, Yokohama (JP)

(73) Assignee: Keio University, Tokyo (JP)

( * ) Notice: Subject to any disclaimer, the term of this patent is extended or adjusted under 35 U.S.C. 154(b) by 289 days.

(21) Appl. No.: 10/565,534

(22) PCT Filed: Jul. 21, 2004

(86) PCT No.: PCT/JP2004/010335

§ 371 (c)(1),
(2), (4) Date: Mar. 1, 2006

(87) PCT Pub. No.: WO2005/109139

PCT Pub. Date: Nov. 17, 2005

(65) Prior Publication Data

US 2007/0112466 A1    May 17, 2007

(30) Foreign Application Priority Data

Jul. 24, 2003    (JP) .............................. 2003-278919

(51) Int. Cl.
*G05B 11/01*    (2006.01)
(52) U.S. Cl. .............................. 700/63; 700/3; 700/19; 700/45; 700/69

(58) Field of Classification Search .................... 700/2, 700/3, 19–21, 28–46, 54–61, 260, 302, 63, 700/69
See application file for complete search history.

(56) References Cited

U.S. PATENT DOCUMENTS 6,436,107 B1 *    8/2002    Wang et al. .................. 606/139

(Continued)

FOREIGN PATENT DOCUMENTS

JP    08-215211 A    8/1996

(Continued)

OTHER PUBLICATIONS

Murakami et al., "Force Sensorless Impedance Control by Disturbance Observer", IEEE 1993.*
Hybrid Position and Force Control without Force Sensor, vol. 11, No. 3, pp. 468-476, 1993 in Japanese with English Abstract.

*Primary Examiner*—Paul L Rodriguez
*Assistant Examiner*—Carlos Ortiz Rodriguez
(74) *Attorney, Agent, or Firm*—Lucas & Mercanti, LLP

(57) ABSTRACT

A position/force control device includes position detectors on a master 1 side and on a slave 3 side. Reaction force estimation observers 2 and 4 estimate reaction force based on outputs of the position detectors. A position control part 5 generates acceleration signals $a_{pm}$, $a_{ps}$ for controlling positions on the master side and on the slave side on the basis of the position signals outputted by the position detectors. The operation force control part 6 generates acceleration signals $a_{fm}$, $a_{fs}$ for controlling forces applied to the master side and to the slave side based upon the outputs from reaction force estimation observers 2 and 4. The acceleration composition part 7 composes the two sets of acceleration signals $a_{pm}$, $a_{ps}$, and $a_{fm}$, $a_{fs}$, and outputs the driving signals for the master side and the slave side.

9 Claims, 12 Drawing Sheets

U.S. PATENT DOCUMENTS

| | | | |
|---|---|---|---|
| 6,516,991 B2* | 2/2003 | Takeishi et al. | 228/4.5 |
| 6,671,581 B2* | 12/2003 | Niemeyer et al. | 700/245 |
| 6,879,880 B2* | 4/2005 | Nowlin et al. | 700/260 |
| 6,915,878 B2* | 7/2005 | Kamen et al. | 182/141 |
| 7,118,582 B1* | 10/2006 | Wang et al. | 606/139 |
| 2002/0121394 A1* | 9/2002 | Kamen et al. | 180/41 |
| 2003/0004610 A1* | 1/2003 | Niemeyer et al. | 700/245 |
| 2003/0132965 A1* | 7/2003 | Santori et al. | 345/763 |
| 2005/0043718 A1* | 2/2005 | Madhani et al. | 606/1 |

FOREIGN PATENT DOCUMENTS

| | | |
|---|---|---|
| JP | 11-272334 A | 10/1999 |
| JP | 2001-198870 | 7/2001 |
| JP | 2002-207336 | 10/2002 |

* cited by examiner (a)

(b)

Reaction Force Observer (a)

(b)

Reaction Force Observer

US 7,672,741 B2

POSITION/FORCE CONTROL DEVICE

This patent application claims the benefit of priority from Japanese Patent Application No. JP/2003-278919 filed Jul. 24, 2003 through PCT Application Ser. No. PCT/JP2004/010335 filed Jul. 21, 2004, the contents of which are incorporated herein by reference.

TECHNICAL FIELD

The present invention relates to a position/force control device capable of controlling a position of an object and force acting on the object with good response without using a force sensor.

BACKGROUND ART

In the fields of human interaction where a human and a machine make contact with each other, a position of an object disposed remotely and force acted on the object are desired to be controlled with good response corresponding to an operation of a man. For example, in such a field as a remote operation apparatus used in a working field in which a man can not physically enter or a remote medical care apparatus for patients living at remote locations, a master/slave control device is used in which the slave side device disposed at a remote place is actuated in response to an operation of the master side device by an operator. For a master/slave control device of this sort there is a demand for realization of a delicate work by controlling a position of an object and force acted on the object with good response.

There are known as the aforementioned master/slave apparatus a unilateral control system where although it can send an instruction from an operator via a master side apparatus to a slave side apparatus, it cannot feedback the work reaction force which the slave side receives from a work object or the like, to an operator, and a bilateral control system where it can send an instruction from the operator via the master to the slave side apparatus, and it can feed back work reaction force which the slave side receives from the work object or the like, to the operator.

Since the bilateral control system feedbacks the work reaction force which the slave receives from the work object or the like to the operator, it is possible to obtain a tactile sensation at a remote site in real time as in reality.

The control device of the bilateral control system constructed by a master/slave type robot feedbacks any force applied to a remote slave to a man through the master. It is also possible that a man can make the slave take the same movement as the master by operating the master. This imparts to an operator the sense that he directly touches a remote object.

Reference 1 proposes one example of such a master/slave control device.

The master/slave control device disclosed in the reference 1 is constituted in such a manner that in a master/slave device where a slave is operated in response to an operation of the master by an operator, when a slave makes contact with an object, force f1 applied to the master by an operation of an operator is estimated and controls the slave such that force f3 applied to the slave follows force f2 in response to the force f1 applied to the master, and the device can retain the control system in the less complicated configuration without additional cost, while keeping the merit of the bilateral control system intact.

FIGS. 14 and 15 illustrate those disclosed also in the reference 1 known as the bilateral control system.

The system illustrated in FIG. 14 is so configured that a deviation between the position of a master 201 and that of a slave 202 is estimated, on the basis of which a position control section 203 controls the position of the slave, and forces acted on the master 201 and the slave 202 are detected by a force detector to feedback a deviation between the forces to a master side, hereby controlling the force of the master side by a force control part 204.

The system illustrated in FIG. 15 is so configured that a deviation between a position of a master 201 and a position of a slave 202 is estimated, in response to which a position control section 203 controls a position of a slave side and a position control section 203' controls a position of a master side, and further forces acted on the master 201 and the slave 202 are detected by a force detector to feedback a deviation between the forces to the master side, hereby controlling the force of the master side by a force control section 204 and controlling the force of the slave side by a force control part 204'.

There is further proposed a control device of robots equipped with such a force detector and a force control part as described above, capable of realizing stable force control with high accuracy even for hard material objects and of possessing a flexible property even when any part of an arm is contacted with the object, as disclosed in reference 2.

Reference 1: Laid-Open Patent Publication No. 2002-307336
Reference 2: Laid-Open Patent Publication No. 2001-198870

DISCLOSURE OF THE INVENTION

Problems to be Solved by the Invention

When force or acceleration information is detected in the foregoing conventional control device, it is general to directly measure it using a force sensor such as a strain gage or an acceleration sensor.

Such direct detection of force or acceleration information using the foregoing force sensor and acceleration sensor suffers from the following problems:

(i) Problem of Signal Noise

Although in detection of force by the force sensor and the acceleration sensor the force is detected by amplifying a minute analogue signal, noise involved in the signal is also amplified. For high frequency noise an influence of the noise can be removed by having the signal passed through a low-pass filter, but in this case a needed signal frequency band is also narrowed.

(ii) Problem of Natural Frequency of the Sensor

In the force detection using the force sensor the force is measured by having the force sensor directly contacted with the surrounding materials. As the force sensor physically has its natural frequency, force measurement is not possible in a frequency band higher than the natural frequency.

(iii) Problem of Change in System Model

The force sensor is installed directly in a system, so that the sensor inertia is inevitably imposed directly upon the system model. Further, as the force sensor measures the force by means of the distortion proportional to the applied force, a physically low rigidity material is used for the force sensor. However, in the system in which the sensor contacts directly with the environment, the system model is forced to be changed due to the low rigidity material of the force sensor. Such a change in the model is a crucial problem in the control of the system.

(iv) Problem of Sensor Price

Force sensors and acceleration sensors are generally expensive so that the entire apparatus also becomes expensive.

Further, when a plurality of variables like position and force are controlled, it is a general case that by providing a position detector and a force detector position and force are controlled by a position control system and a force control system, as illustrated in FIGS. 14 and 15.

However, in the control system constituted as above position and force are controlled by each of the position control system and the force control system, so that these systems interfere with each other, often resulting in no gain raised, and consequently leaving some errors.

Further, provided that in the aforementioned control system the force detection is conducted using a force sensor such as a strain gage, a measurable frequency band is limited to a narrow range owing to influences of noise and the natural frequency or the like of the force sensor as previously described, and the inertia and low rigidity of the material of the force sensor affect a system model, preventing response performance in a high frequency band from being enhanced.

Such vulnerability with the conventional bilateral control system results in problems that the system becomes unstable once it touches a hard environmental material, that instantaneous impulsive force is not attained, and that an operator feels it heavy to operate. Thus, as information of delicate tactile sensation cannot be transmitted to the operator, it has been impossible for such a system to realize a delicate work in the field of remote medical care for example.

Furthermore, there is another problem with the conventional control system, that a relatively expensive force sensor is employed in addition to the position sensor, which results in the high price for the apparatus.

The intention of this invention is to solve the problems with the prior art, by providing a position/force control device capable of improving response performance in a high frequency band and of realizing a delicate work.

Means to Solve the Problems

While analog information from a force sensor using a conventional strain gage and an acceleration sensor inevitably involves signal noise, position information is detectable as digital information and hence is unlikely to be affected by noise.

In the present invention there is provided reaction force detection means instead of the force sensor to estimate reaction force acting on an object from its position information.

It is hereby possible to estimate reaction force without noise involved. Further, a position detector can obtain position information without making contact with a motor shaft so that it has no limit of a measurable frequency band, free from a natural frequency involved in a force sensor and prevents a system model from being affected by inertia and rigidity of the material used in the sensor. Further, the use of no other than a position sensor ensures an inexpensive establishment of the system.

Moreover, on the condition that a position control system and a force control system are provided independently for controlling position and force respectively as in prior art, these two systems interfere with each other, in consequence that a raise of gain cannot be expected.

To solve this, position and force are converted to acceleration signals, and both signals are composed to obtain a driving signal for driving an object in the present invention.

It is hereby possible to independently set respective gains without any interference between the position control and the force control.

The present invention solves the aforementioned problems in such a manner described as follows:

(1) Reaction force estimation observer estimates the reaction force of the slave side, based upon the position information detected by position detector and the driving signal to the driving means.

A first acceleration signal is estimated on the basis of reaction force undergone by the object and a goal force signal, and a second acceleration signal is estimated on the basis of the aforementioned position signal and a goal position, and further a driving signal to the foregoing driving means is outputted on the basis of the first and second acceleration signals.

(2) The above mentioned control (1) is applied to a control device for controlling the position of the object and the force undergone by the object in response to a position command signal and a force command signal.

More specifically, position detection means for detecting the position of the object is provided to estimate the reaction force undergone by the object by making use of the reaction force detection means as described above.

Moreover, a deviation between the position command signal and the position signal outputted by the position detection means is estimated, and the deviation signal is converted to the first acceleration signal, and further a deviation between the foregoing reaction force detected by the reaction force detection means and the force command signal is estimated, and the deviation signal is converted to a second acceleration signal, and further the first and the second acceleration signals are added to output the driving signal to the driving means.

(3) The control of (1) is applied to a bilateral control system wherein positions of the object on the slave side and of the operation part on the master side are controlled in response to the position deviation between the operation part on the master side and the object on the slave side to drive the object with a driving force in response to the operation force on the master side as well as to transmit the force undergone by the object to the master side.

More specifically, the first and the second position detectors are provided for detecting the position of the operation part on the master side and that of the object on the slave side respectively, and the first and second reaction force detection means estimate the reaction force undergone by the operation part of the master side and the reaction force undergone by the object on the slave side respectively as described above.

Additionally, a deviation between a position signal outputted by the first position detection means and a position signal outputted by the second position detection means is estimated, and the deviation is converted to the first and second acceleration signals for controlling the master side and the slave side. Furthermore, the total sum of outputs of the first and second reaction force detection means is estimated, and converted to the third and fourth acceleration signals for controlling the master side and the slave side respectively.

The first and third acceleration control signals are added and the second and fourth acceleration control signals are added, and a driving signal to the master side operation part is outputted on the basis of the addition result of the first and third acceleration control signals, and a driving signal to the object on the slave side is outputted on the basis of the addition result of the second an fourth acceleration control signals.

Effect of the Invention

The following effects are ensured in the present invention:

(1) The reaction force detection means is provided, and the force applied to the object is estimated on the basis of the output of the position detection means, so that the force applied to the object can be estimated without being influenced by signal noise, the natural frequency and the inertia of the sensor itself, It is therefore possible to control the position of an object and the force applied to the object with good response by employing a highly accurate sensor as the position detection means and sampling a position detection result in a short cycle of time.

And, as no other than the position detection means is required as a sensor, a relatively expensive force sensor is not required, so that the system can be constructed inexpensively.

(2) The first acceleration signal is estimated from the reaction force undergone by the object and the force signal of the targeted position and the second acceleration signal is estimated from the position signal detected by the position detection means and the goal position, and further the first and second acceleration signals are composed to output the driving signal to the driving means for controlling the object, so that there is eliminated the problem that the position control and the force control interfere with each other as in conventional control devices, making it possible to independently set a gain of the position control and a gain of the force control. For this, real time control is ensured without causing any position errors by increasing the gain of the position control.

(3) The present invention is applied to the bilateral control, in which the position deviation is estimated from an output of the position detection means provided on the master side and on the slave side and is converted to the acceleration signal, and the reaction forces on the master side and on the slave side estimated by the reaction force detection means on the master side and on the slave side are added and converted to an acceleration signal, and further the acceleration signal estimated from the position deviation and the acceleration signal estimated from the addition result of the reaction forces are synthesized to control the master side and the slave side, so that it becomes possible to independently set the gain of the position control and the gain of the force control as described previously. For example, the master side and the slave side can be controlled such that position errors of the master side and of the slave side become zero and the forces of both sides conform to the sum of aforementioned reaction forces.

I is therefore possible to transmit the operation force of the master side to the slave side with good response without causing any position errors of the both sides and to transmit the force applied to the slave side to the master side with good response. Consequently, a delicate work can be realized.

Figure 1:
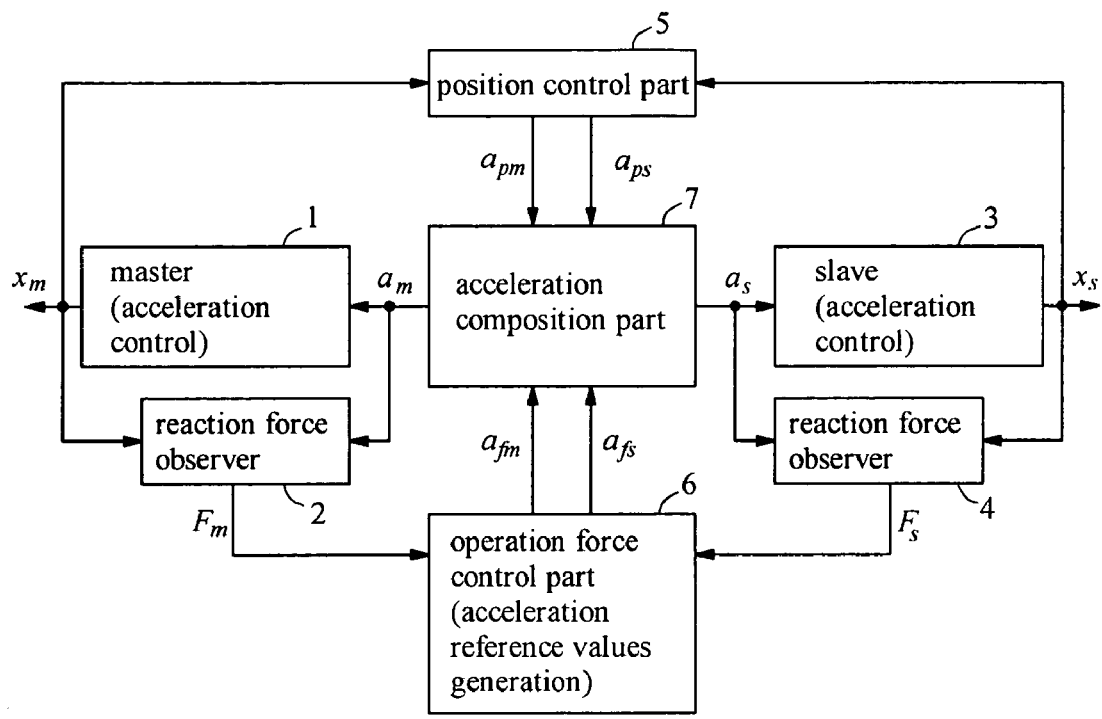
FIG. 1 illustrates a schematic constitution of a position/force control device of a first embodiment of the present invention.

DESCRIPTION OF SYMBOLS 1 master
1a linear motor
1b position detector
1c operation part
2 reaction force estimation observer
3 slave
3a linear motor
3b position detector
3f gripper part
4 reaction force estimation observer
5 position control part
6 operation force control part
7 acceleration composition part
11 position/force command generation part
13 slave
14 reaction force estimation observer
15 position control part
16 operation force control part
17 acceleration composition part

BEST MODE FOR IMPLEMENTING THE INVENTION

FIG. 1 illustrates a schematic constitution of a position/force control device of the first embodiment of the present invention when it is applied to the bilateral control.

In the same figure, designated at 1 is a master operated by a worker, which comprises an operation part operated by an operator or a worker; a master side motor for driving the operation part; and a master side position detector for detecting the position of the aforementioned motor, 2 is a reaction force estimation observer for estimating as described later the force applied on to the operation part on the basis of the output from the position detector of the master side and the driving signal to the master side.

Designated at 3 is a slave operational in response to the operation of the master 1, which comprises a slave side motor for driving an object and a slave side position detector for detecting the position of the motor. The aforementioned object refers to any operation part for actually performing works at a remote place such as a hand of a robot which performs various works, and a gripper part of the forceps which will be described later (herein, called an object including these members).

Designated at 4 is a reaction force estimation observer, which has the same constitution as the foregoing master side reaction force estimation observer and estimates force applied to the object from an output of the slave side position detector and the driving signal to the slave side as described later.

The position signal $x_m$ of the position of the operation part detected by the master side position detector and the signal $x_s$ of the position of the object detected by the slave side position detector are sent respectively to the position control part 5, which converts these position signals to acceleration reference values $a_{pm}$, $a_{ps}$.

Further, the master side force signal $F_m$ detected by a master side reaction force estimation observer 2 and the slave side force signal $F_s$ detected by a slave side reaction force estimation observer 4 are sent to an operation force control part 6, which converts these force signals $F_m$, $F_s$ to acceleration reference values $a_{fm}$, $a_{fs}$.

The acceleration composition part 7 composes the acceleration reference values $a_{pm}$, $a_{ps}$ and the acceleration reference values $a_{fm}$, $a_{fs}$, and outputs an acceleration command signal $a_m$ that is a driving signal to the master side motor and an acceleration command signal $a_s$ that is a driving signal to the slave side motor.

The reaction force estimation observers 2 and 4, position control part 5, operation force control part 6, and acceleration composition part 7, all used as control devices of the present embodiment, can be actualized by means of a computer. When the control system of the present embodiment is constituted by computer, the output of the position detector is incorporated into the computer programmed with a predetermined sampling period, and arithmetic operation processing for realizing the above-described function is conducted with software to control motors on the master side and the slave side.

In the following, there will be described the position/force control device of the embodiment of the present invention applied to the bilateral control system while taking as an example a case where a forceps for medical care is remotely controlled.

Figure 2:
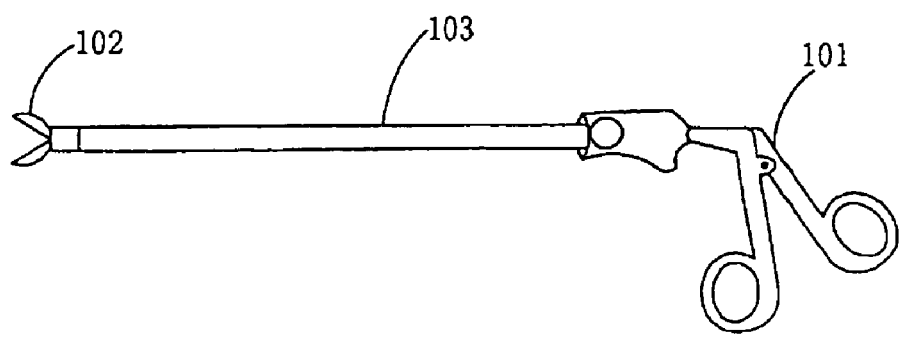
FIG. 2 illustrates an exemplary constitution of a forceps for use in operations or the like by a surgeon :(a) view of the whole, and (b) a view of the detailed part.
Figure 2:
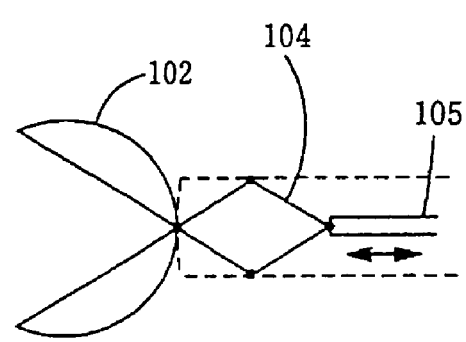
Figure 2:
Figure 2:
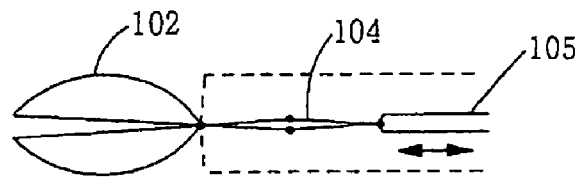

The forceps is a medical apparatus for use in an operation or the like by a surgeon, which comprises, as illustrated in FIG. 2(*a*), a handle part 101 (hereinafter referred to as an operation part 101) and a forceps part 102 (hereinafter referred to as a gripper part 102).

An operation member (not shown in FIG. 2(*a*)) penetrates a shaft part 103 of the forceps, and is moved left and right in the same figure by opening and closing a handle 1*e* (shown in FIG. 3) of the operation part 101 by hand.

Figure 3:
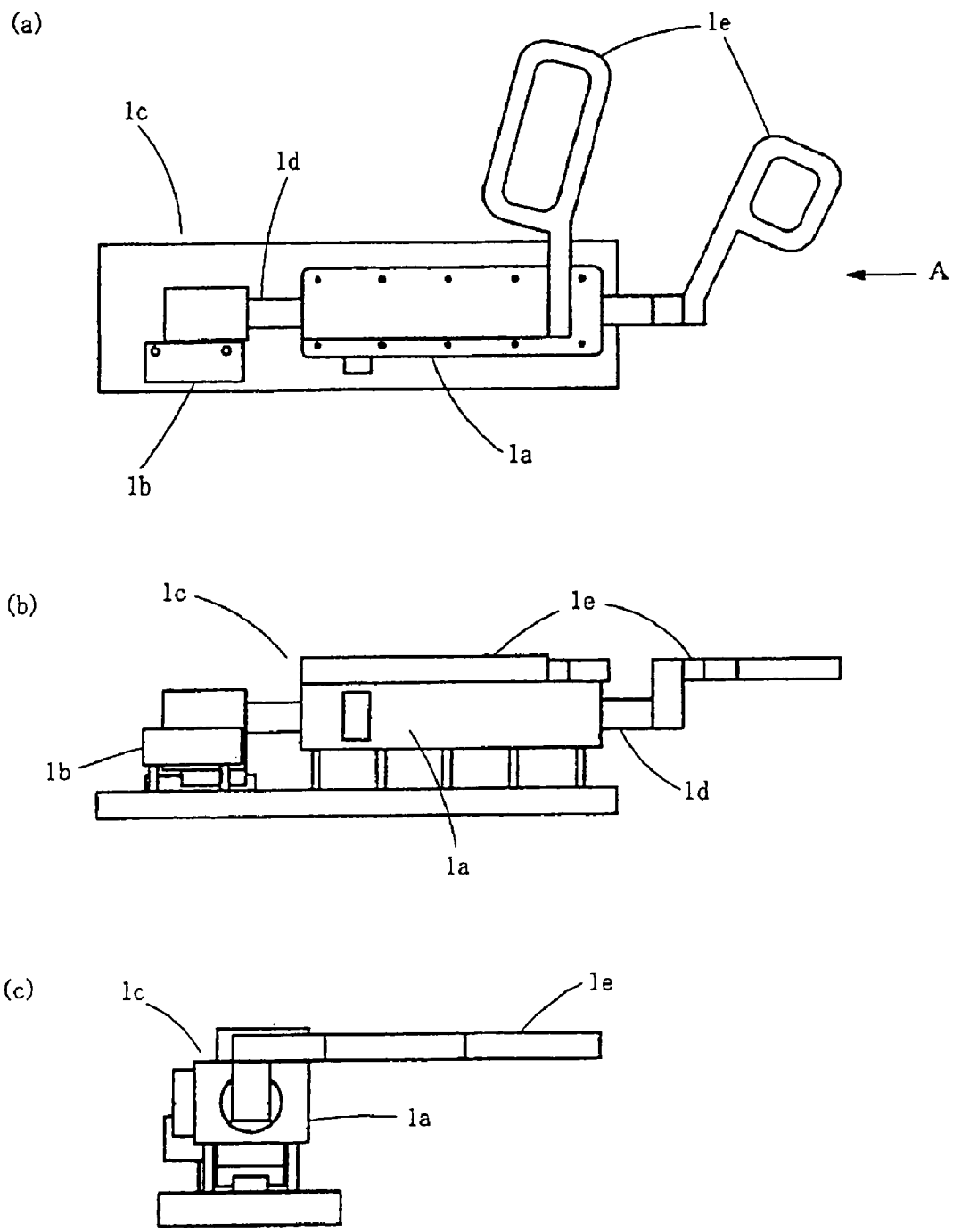
FIG. 3 illustrates an apparatus constitution of a master side in the first embodiment of the present invention: (a) view from above, (b) a side view, and (c) a different view of the (a).

The gripper part 102 is, as illustrated in FIG. 2(*b*), coupled with a link mechanism 104, and the operation member 105 is coupled with the other end of the link mechanism 104, the gripper part 102 shown in FIG. 2(*b*) can be opened and closed by operating of 1*e* shown in FIG. 3(*a*), more specifically, by moving the above mentioned operation member in the direction of an arrow in the FIG. 2(*b*).

In the present embodiment, the forceps is divided to the operation part 101 assumed to be a master side and the gripper part 102 assumed to be a slave side, to each of which a linear motor is coupled, it is designed in such a manner that the linear motor is employed in the control system illustrated in FIG. 1 to control the gripper part 102 installed at a remote place in response to an operation of the operation part 101.

Although in the following there will be described uni-axial control for opening and closing the gripper part in response to the operation of the operation part 101, it is also possible to conduct multi-axial control for rotating the whole of the gripper part and rocking the whole of the same in response to the operation of the operation part 101 by providing a plurality of control systems described in the present embodiment.

Figure 4:
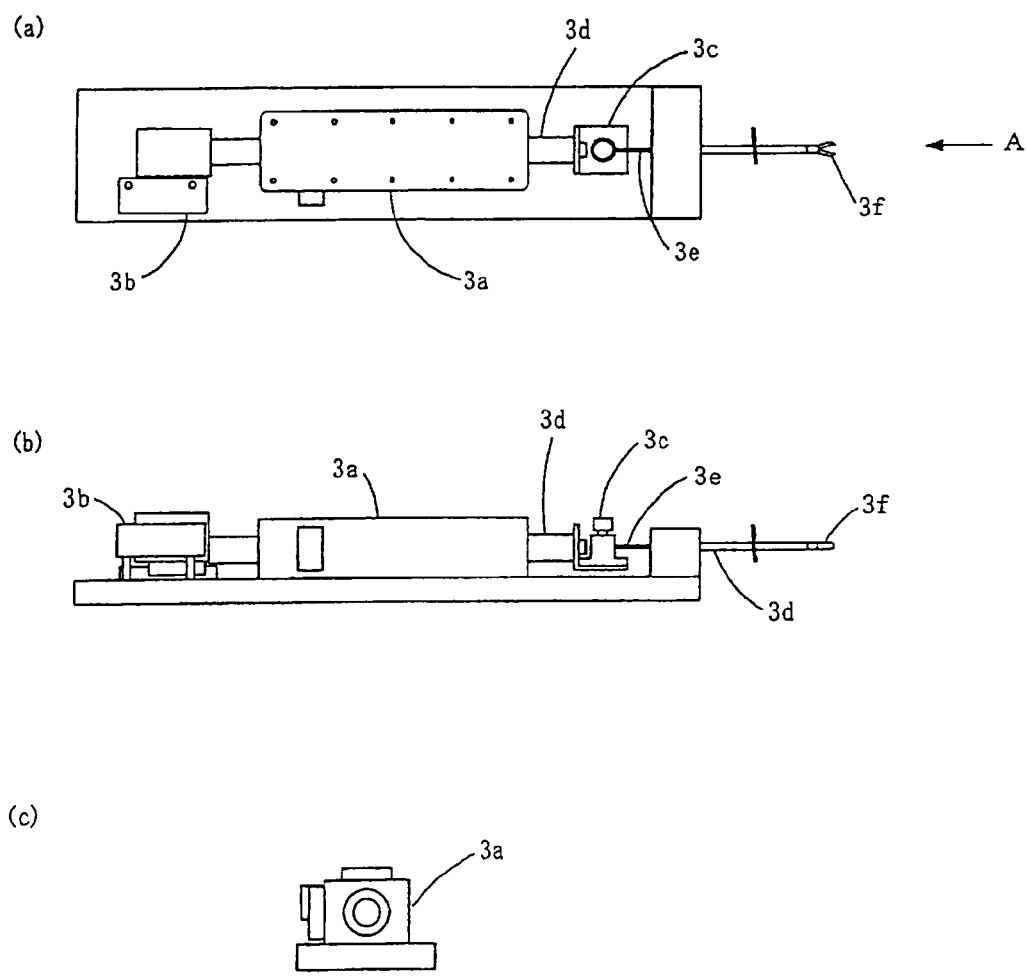
FIG. 4 illustrates an apparatus constitution of a slave side in the first embodiment of the present invention; (a) view from above, (b) side view, and (c) a different view of the (a).

Referring to FIGS. 3 and 4, there are illustrated apparatus constitutions on the master side and on the slave side of the present embodiment: FIG. 3(*a*) a view from above of a master side apparatus; (*b*) a side view; and (*c*) a view of the same figure (*a*) seen from a direction A indicated in the same figure (*a*).

In the same figures, designated at 1*a* is a linear motor where one of the handles 1*e* constituting an operation part 1*c* is coupled with a movable shaft 1*d* of the linear motor 1*a*, while the other of the handles 1*e* is fixed to a case of the linear motor 1*a*. Accordingly, the movable shaft 1*d* of the linear motor 1*a* is moved in left and right directions in the same figures (*a*) and (*b*) by operating the handles 1*e* of the operation part 1*c* with a hand. Designated at 1*b* is a master side position detector for detecting the position of the movable shaft 1*d* of the linear motor 1*a*.

FIG. 4(*a*) is a view from above of the slave side apparatus, (*b*) a side view, (*c*) a view when the same figure (*a*) is seen from a direction A as indicated in (*a*).

In the same figure, designated at 3*a* is a linear motor, to a movable shaft 3*d* of which an operation member 3*e* penetrating the interior of a shaft part 3*d* of the forceps via a mounting metal attachment 3*c* is coupled, and on the tip end side of the operation member 3*e* a gripper part 3*f* is mounted via a link mechanism as described previously.

Accordingly, when the movable shaft 3*d* of the linear motor 3*a* moves left and right, the operation member 3*e* moves left and right in the same figures (*a*) and (*b*) to open and close the gripper part 3*f*. Designated at 3*b* is a slave side position detector for detecting a position of the movable shaft 3*d* of the linear motor 3*a*.

For selecting a liner motor for the above mentioned case, it is desirable to use a motor with less friction force, and in the case of a rotary movement required, it is possible to use a direct drive motor or the like, in addition to such a linear motor as described above, Further, for a position detector for the above mentioned case, it is desirable to use a high precision detector, and for improving response it is necessary to sufficiently shorten a sampling period to incorporate a detection result of the position detector.

Figure 5:
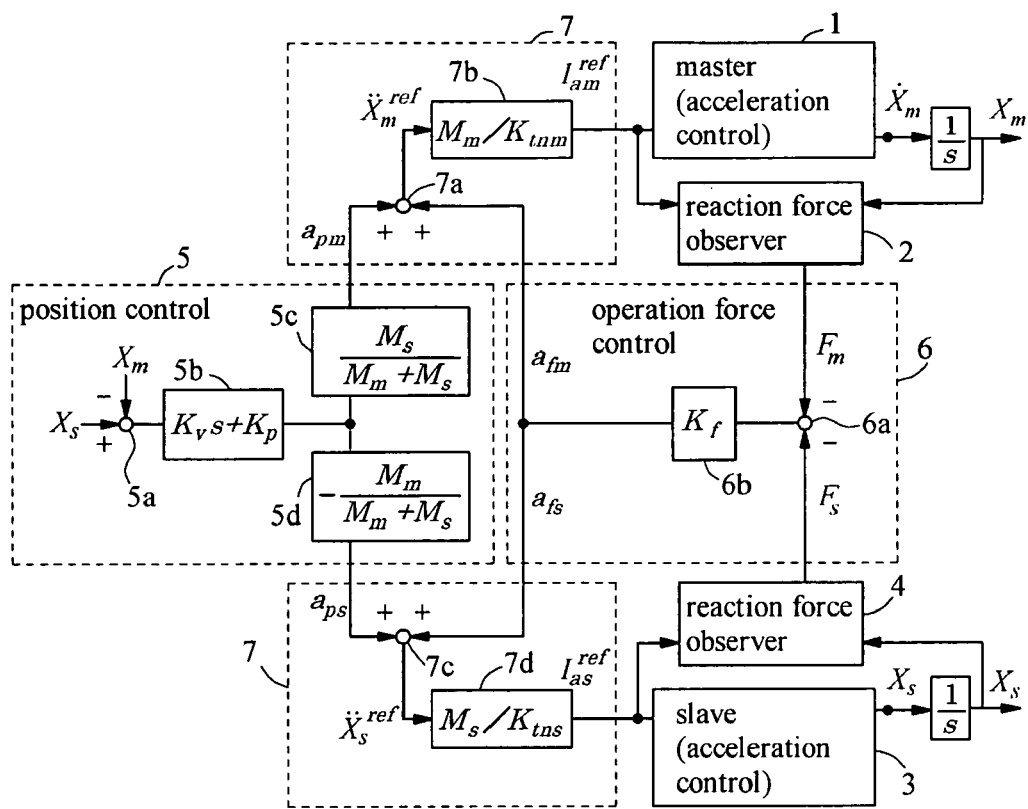
FIG. 5 is a block diagram of a control system of the first embodiment of the present invention.

Referring to FIG. 5, a block diagram of the control system of the present embodiment is illustrated.

In FIG. 5, the same symbols shall be applied to the same members as those illustrated in FIG. 1. Designated at 1 is a master which comprises the linear motor 1*a*, the position detector 1*b*, and the operation part 1*c*, as illustrated in FIG. 3. A reaction force estimation observer 2 on the master side generates an estimated value $F_m$ of the force applied to the master side from the current signal $I_{am}^{ref}$ supplied to the linear motor 1*a* of the master 1 and a position detection signal $X_m$ in response to the position of the movable shaft 1*d* (i.e. a position of the operation part 1*c*) of the linear motor 1*a*, which is detected by the position detector 1*b*.

Designated at 3 is a slave which comprises the linear motor 3*a*, the position detector 3*b*, and the gripper part 3*f* to be operated by the foregoing mechanism as illustrated in FIG. 4.

The reaction force estimation observer 4 of the slave side estimates an estimation value $F_s$ of the force applied to the slave side from a current signal $I_{as}^{ref}$ supplied to the linear motor 3a of the slave 2 and a position detection signal $x_s$ in response to a position of the movable shaft 3d (i.e. a position of the gripper part 1f) of the linear motor 3a which is detected by the position detector 3b.

Designated at 5 is a position control part which comprises a subtraction part 5a for estimating a difference between a position signal $x_m$ of the operation part 1c of the master side detected by the position detector 1b of the master side and a position signal $x_s$ of the gripper part 1f of the slave side detected by the position detector 3b of the slave side, a control part 5b for multiplying the output result from the subtraction part 5a by $(K_{vs}+K_p)$, and conversion parts 5c, 5d for generating acceleration reference values $a_{pm}$, $a_{ps}$ by multiplying an output from the control part 5b by $[M_s/(M_m+M_s)]$, $[-M_s/(M_m+M_s)]$ respectively. Herein, $K_p$ is a position gain, $K_v$ a velocity gain, $M_m$ inertia of the master side, and $M_s$ inertia of the slave side.

Designated at 6 is an operation force control part which comprises (i) an addition part 6a for outputting the sum of an estimation value $F_m$ of the force applied to the 1c of the operation part on the master side outputted by the reaction force estimation observer 2 of the master side and an estimation value $F_s$ of the force applied to the glipper part 3f on the slave side outputted by the reaction force estimation observer 4 of the slave side and (ii) a conversion part 6b for generating acceleration reference values $a_{fm}$, $a_{fs}$ by multiplying a force gain $K_f$ by the output of the addition part 6a. The force gain $K_f$ is a reciprocal number of a virtual inertia and can be set to an arbitrary value, equivalent mass of which can be apparently reduced by setting an appropriate value of $K_f$.

Designated at 7 is an acceleration composition part which comprises (i) an addition part 7a for adding the acceleration reference values $a_{pm}$, $a_{fm}$ and outputting an acceleration reference value $(x_m^{ref})''$ of the master side; (ii) a conversion part 7b for multiplying an output of the addition part 7a by $[M_m/K_{tmm}]$ and generating a current reference value $I_{am}^{ref}$ for driving the linear motor 1a of the master side; and (iii) an addition part 7c for adding the acceleration reference values $a_{ps}$, $a_{fs}$ and outputting an acceleration reference value $(x_s^{ref})''$ of the slave side; and (iv) a conversion part 7d for multiplying an output of the addition part 7c by $[M_s/K_{tms}]$ and generating a current reference value $I_{as}^{ref}$ for driving the linear motor 3a of the slave side. Herein, $M_m$, $M_s$ are the inertia of the master side and the inertia of the slave side, and $K_{tmm}$, $K_{tms}$ are a master torque constant and a slave torque constant respectively.

It is herein noticed that although on the drawings first differential or quadratic differential is indicated by attaching 1 or 2 dots on a symbol, in the specification ['] is attached to the symbol for first differential and [''] is attached to the same for quadratic differential.

Figure 6:
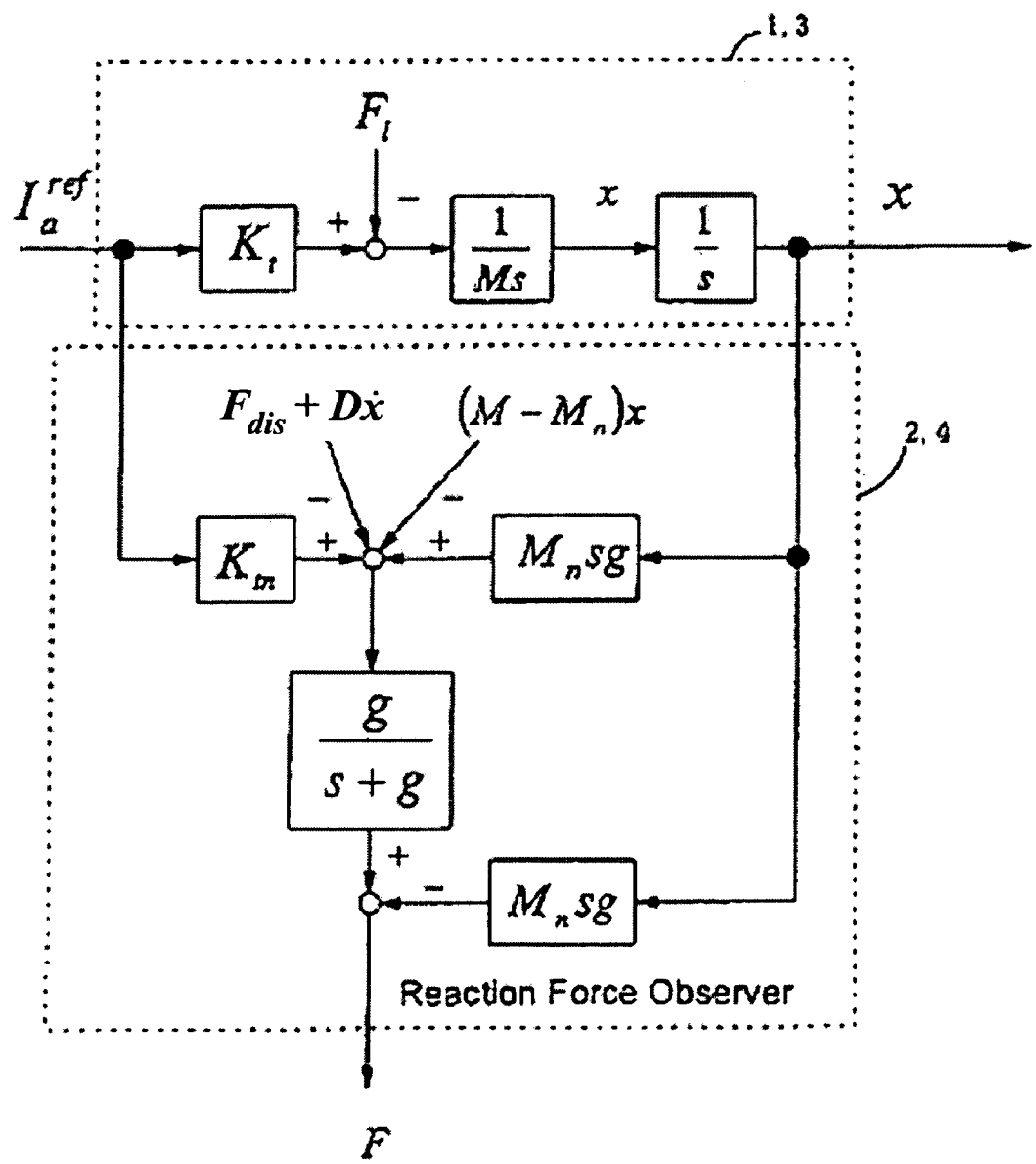
FIG. 6 is a block diagram of a reaction force estimation observer employed in the present invention.

Referring to FIG. 6 a block diagram of the reaction force estimation observers 2, 4 is illustrated. In the same figure, 1, 3 are block diagrams on the master side and on the slave side, and $I_a^{ref}$ is a current reference value supplied to the linear motor 1a, 3a, Kt is a thrust constant; and $I_a^{ref}*K_t$ corresponds to the driving force of the linear motor. $F_1$ is a load of the linear motor and M is inertia of the master side and slave side. When the current $I_a^{ref}$ is supplied to the linear motor 1a, 3a and the load is $F_1$, the master side and the slave side move at a velocity x' illustrated in the same figure, and its position x is obtained by integrating the velocity x'.

Into the reaction force estimation observer 2, 4 the current reference value $I_a^{ref}$ and the position x are input, and the reaction force estimation observer 2 and 4 output estimated reaction forces of the master side and the slave side $F_m$, $F_s(=F)$ according to the following formula (1):

$$F=[g/(s+g)]*[I_a^{ref}K_m+xM_n sg-F_{init}]-xM_n sg \qquad (1).$$

Herein, $F_{init}=F_{dis}+Dx'+(M-M_n)x'$. The expression g/(s+g) is a first order frequency selection filter. The symbols in the above formula and in FIG. 6 express the following values: M for inertia, $M_n$ for nominal value of inertia, $K_{tn}$ for nominal value of thrust constant, x for position, x' for velocity, $F_{dis}$ for Coulomb friction, and D for viscous friction coefficient.

Further, $F_{dis}$, D, M, $M_n$ etc. are assumed to be known values estimated by a preliminary experiment.

The reaction forces of the master side and the slave side by the use of reaction force estimation observer can be inexpensively estimated without being influenced by signal noise, the natural frequency of a sensor itself, and sensor inertia as described previously, compared with the case using the force sensor, Further, influences by the Coulomb friction and the viscous friction coefficient can be made minimum.

In order to confirm the validity of indirect sensing, a comparison is made for the case of direct measuring the force using a conventional force sensor equipped with strain gage and for the case of indirect measuring the force equipped with the reaction force estimating observer.

Figure 7:
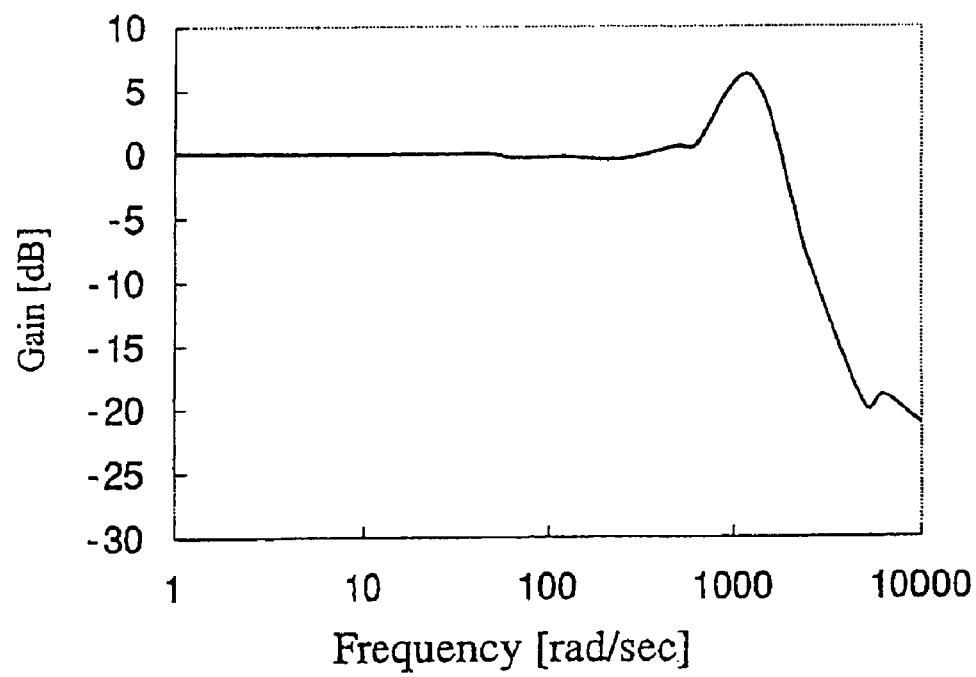
FIG. 7 illustrates frequency characteristics of (a) a conventional force sensor and (b) a reaction force estimating observer.
Figure 7:
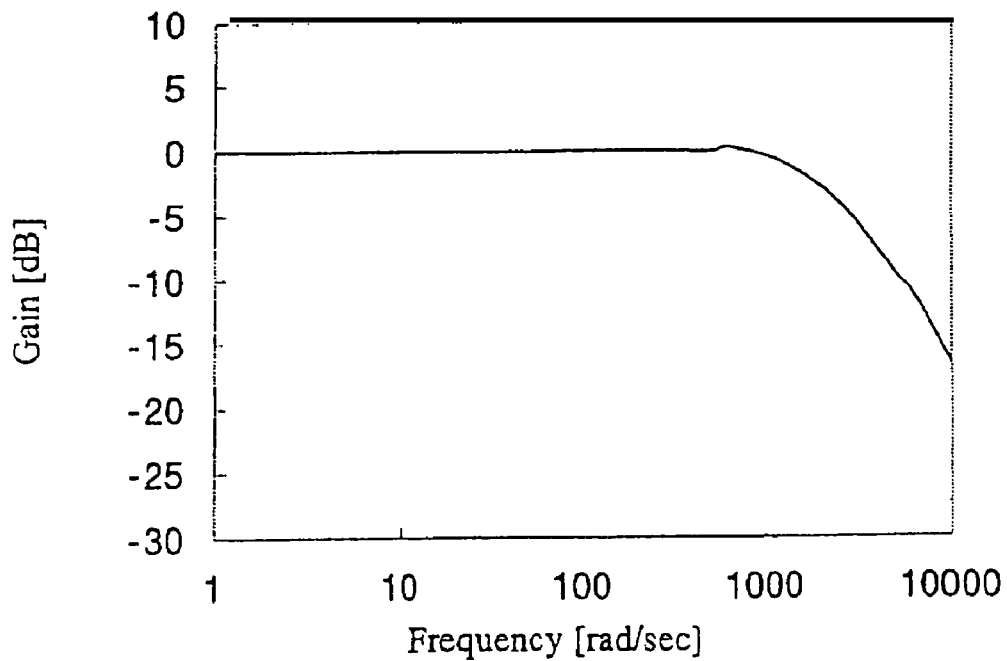

FIG. 7 illustrates an experimental result. The abscissa in the same figure indicates Ω (rad/sec), and the ordinate indicates ordinate gain (dB). Moreover, FIG. 7(a) represents frequency characteristics of a conventional force sensor, while Fig(b), those of the reaction force estimation observer.

As obvious from the same figures, for the conventional force sensor, a measurable frequency band is limited to about 500 rad/sec or lower due to the existence of the natural frequency, while for the reaction force estimation observer, force can be measured for a wider band up to a targeted gain of 1500 rad/sec.

Figure 8:
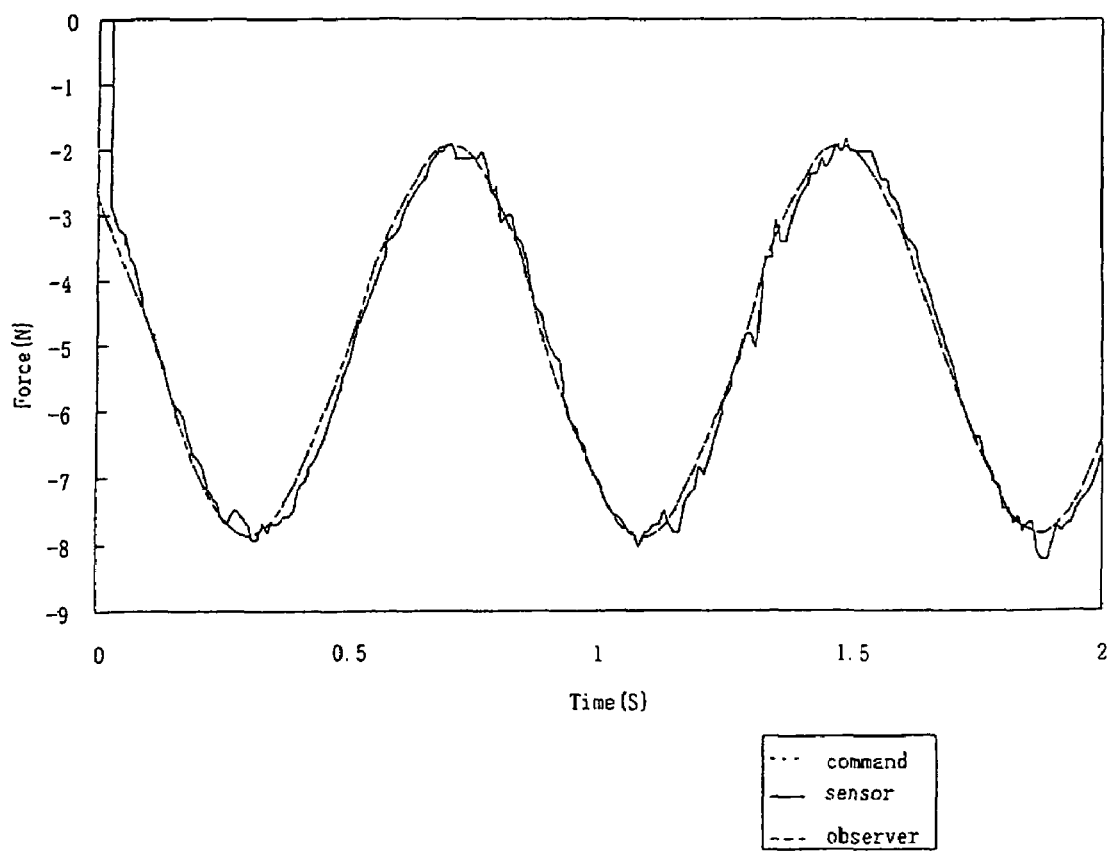
FIG. 8 is a chart illustrating outputs of a conventional force sensor and of a reaction force estimation observer when commands are changed like a sinusoidal wave.

FIG. 8 is a view showing a comparison of outputs from the conventional force sensor using a strain gage and the reaction force estimation observer in such a manner that a command value (applied force) is transformed in a sinusoidal-like wave. The abscissa in the same figure indicates time (sec) and the ordinate indicates the ordinate force (Newton), with a dotted line in the same figure indicating a command value(given force), a broken line an estimation result by the reaction force estimation observer, and a solid line indicating a detection result by a conventional force sensor (the command value and the estimation result by the reaction force estimation observer are substantially overlapped).

As illustrated in the same figure, the output of the reaction force estimation observer is substantially coincident with the command value, but the output of the conventional force sensor is slightly more retarded than the command value and the detection result is partly oscillatory owing to the natural frequency and the inertia.

As clarified from FIGS. 7 and 8, when the reaction force estimation observer is used jn the system, it ensures measurement over a wide frequency band and ensures an estimation of force applied to the master side or the slave side with substantially no delay, so that the master side and the slave side are made to be controlled with good response, compared with the system in which the conventional force sensor is employed.

The reaction force estimation observer is disclosed in, for example, "Ohnishi, Robust Motion Control by Disturbance Observer", Journal of The Robotics Society of Japan vol. 11, No. 4, pp. 486 to 493, 1993 or the like.

Figure 9:
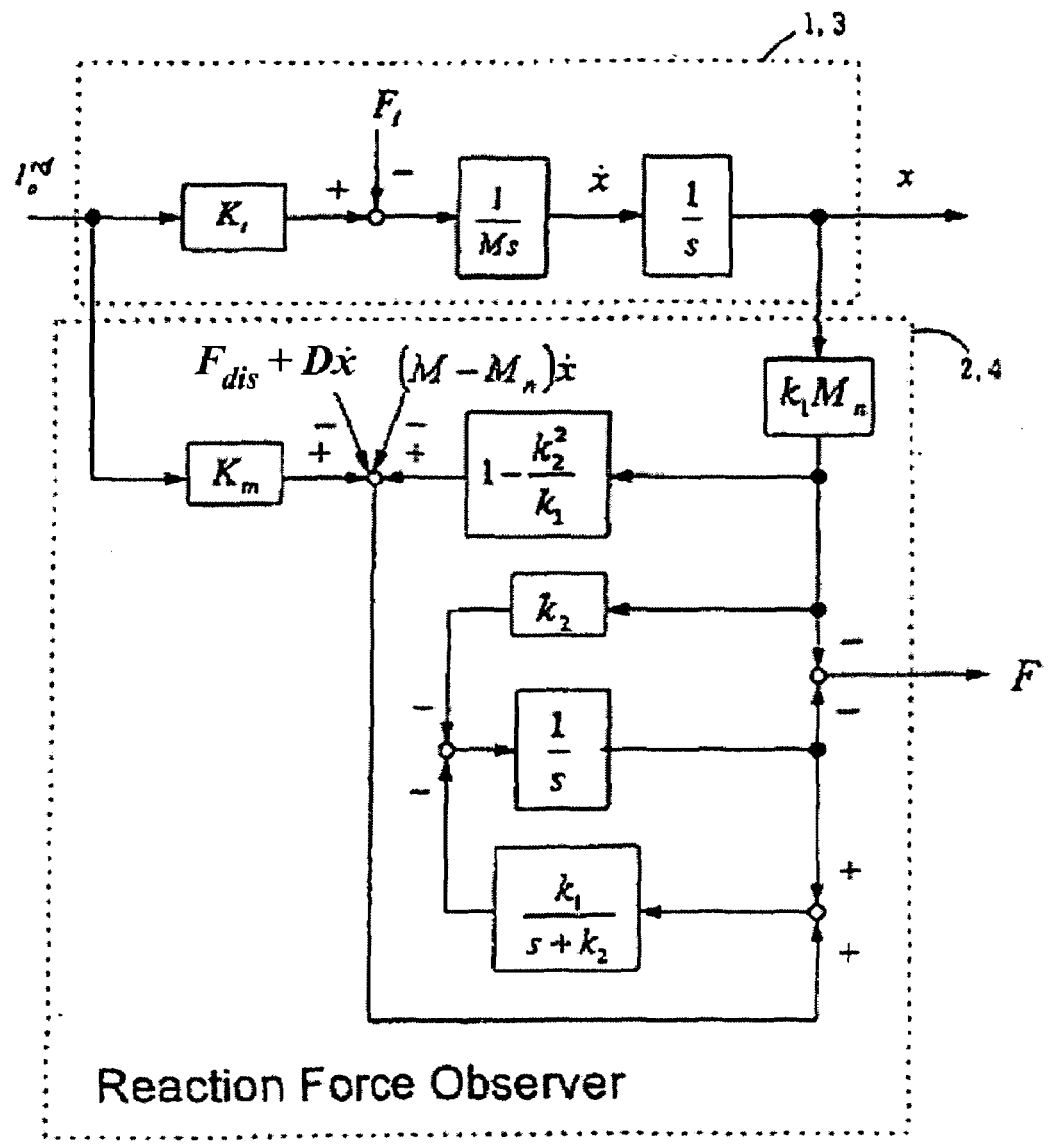
FIG. 9 is a block diagram illustrating another exemplary constitution of reaction force estimation observer.

Referring to FIG. 9, a view illustrating another example of the constitution of the reaction force estimation observer is given, where there is shown a case using a secondary filter represented by a transfer function of $[k_1/(s^2+k_2s+k_1)]$ instead of $[g/(s+g)]$ in FIG. 6 as the frequency selection filter.

The poles of the above mentioned expression of $[k_1/(s^2+k_2s+k_1)]$ are obtained from the formula of $s^2+k_2s+k_1=0$, and when the poles are designated to $\alpha$, $\beta$, then the poles satisfy $\alpha+\beta=-k_2$, $\alpha\beta=k_1$.

Regarding the reaction force estimation observer illustrated in FIG. 9, the reference is available such as the following document; K. Ohnishi, M. Shibata, T. Murakami, "Motion Control for Advanced Mechatronics", IEEE/ASME Transactions on Mechatronics"

In the following, there will be described an operation of the control device of the present embodiment illustrated in FIGS. 3, 4, and 5.

When the operation part 1c of the master side is operated, the movable shaft 1d of the linear motor 1a is moved, and the position of the movable shaft 1d is detected by the position detector 1b.

An output of the position detector 1b and an output of the position detector 3b of the slave side are sent to the position control part 5 which in turn generates and outputs the acceleration reference values $a_{pm}$, $a_{ps}$ on the basis of a deviation of the outputs.

In contrast, the reaction force estimation observer 2 of the master side outputs an estimated value of $F_m$ of the force applied to the master side.

The operation force control part 6 estimates the sum of the estimated value $F_m$ of the force applied to the master side and the force $F_s$ acted upon the slave side and outputted by the reaction force estimation observer 4 of the slave side, and generates and outputs acceleration reference values $a_{fm}$, $a_{fs}$ on the basis of the sum.

The acceleration reference value $a_{ps}$ and the acceleration reference value $a_{fs}$ are sent to the acceleration composition part 7, which in turn generates the current reference value $I_{as}^{ref}$ from the sum of the acceleration reference value $a_{ps}$ and the acceleration reference value $a_{fs}$, and further generates the current reference value $I_{am}^{ref}$ from the sum of the acceleration reference value $a_{pm}$ and the acceleration reference value $a_{fm}$.

The current reference value $I_{as}^{ref}$ is given to the linear motor 3a of the slave side to drive the linear motor 3a. Likewise, the current reference value $I_{am}^{ref}$ is given to the linear motor 1a of the master side to drive the linear motor 1a.

Provided that by operating 1c of the operation part of the master side there occurs a position error on the movable shaft of the linear motor 3a of the slave side and on the movable shaft of the linear motor 1a of the master side, a driving signal serving to correct the position error is given to the linear motor 1a of the master side and to the linear motor 3a of the slave side from the acceleration composition part 7 in order to drive the movable shafts of the linear motor 1a of the master side and of the linear motor 3a of the slave side.

Hereby, the linear motor 1a of the master side and the linear motor 3a of the slave side are controlled such that positions of the movable shafts thereof are coincident with each other. More specifically, the degree of opening of the gripper part 3f of the slave side is controlled in response to the position of the handle 1e of the operation part 1c of the master side.

Further, simultaneously with this, the force $F_s$ applied to the gripper part 3f is estimated in the reaction force estimation observer 4 and the force $F_m$ applied to the operation part 1c is estimated in the reaction force estimation observer 2, and the acceleration reference values $a_{fm}$, $a_{fs}$ in response to the sum of $F_s$ and $F_m$ are given to the acceleration composition part 7.

The acceleration composition part 7 drives the linear motor 1a of the master side and the linear motor 3a of the slave side in response to the sum of the force $F_s$ applied to the gripper part 3f and the force $F_m$ applied to the operation part 1c.

Hereby, the operation part 1c of the master side and the gripper part 3f of the slave side are controlled such that they copy the sum of the force applied to the operation part 1c of the master side and the force applied to the gripper part 3f of the slave side.

More specifically, when the operation part 1c of the master side is operated to grip an object with the gripper part 3f of the slave side, the force corresponding to the reaction force applied to the gripper part 3f is transmitted to the operation part 1c, through which a worker can perceive the reaction force or the like from the object gripped by the gripper part 3f.

Although in the above description the master side was operated, also when the slave side is operated, the master side is controlled as in the above description to transmit the force of the master side to the slave side.

In the bilateral control device of the present embodiment, as described above, there is provided the position detection means for detecting the position of the operation part of the master side and the position of the object of the slave side, on the basis of the output of which the reaction force estimation observer estimates the reaction forces undergone by the operation part of the master side and by the object of the slave side, so that it is possible to inexpensively estimate the reaction force applied to the object of the slave side without being influenced by signal noise, the natural frequency of a sensor itself, and sensor inertia. It is also possible to minimize influences of the Coulomb friction and viscous friction coefficient.

Therefore, provided that a high precision sensor is employed as the position detection means, and a control gain of the position control part is set to be large by sampling the position detection result with a relatively short period, it is possible to control the position and the operation force with good response without causing position errors of the master side and the slave side.

Further, as the position control part 5 and the operation force control part 6 are provided, to generate the acceleration reference values, which are composed by the composition part 7, to drive the linear motor, it is possible to independently set the gain of the position control and the gain of the operation force control.

It is therefore possible to set the position control part 5 such that position errors of the master side and the slave side are eliminated, and also possible to control the master side and the slave side so as to copy the sum of the reaction forces of both sides. Further, it is possible to freely set the operation force of the master side by the setting of the force gain Kf of the operation force control part 6.

The effectiveness of the present invention was confirmed by remote-control operation of the forceps by means of the bilateral control device of the present embodiment.

In the experiment, the control device is constituted with a computer, and a linear encoder with a resolution capacity of about 1 μm is employed as the position detector, and a signal is incorporated into the control device composed of the computer with a sampling period of about 100 μs to subject the forceps to bilateral control. Response of about 160 Hz was hereby attained.

Figure 10:
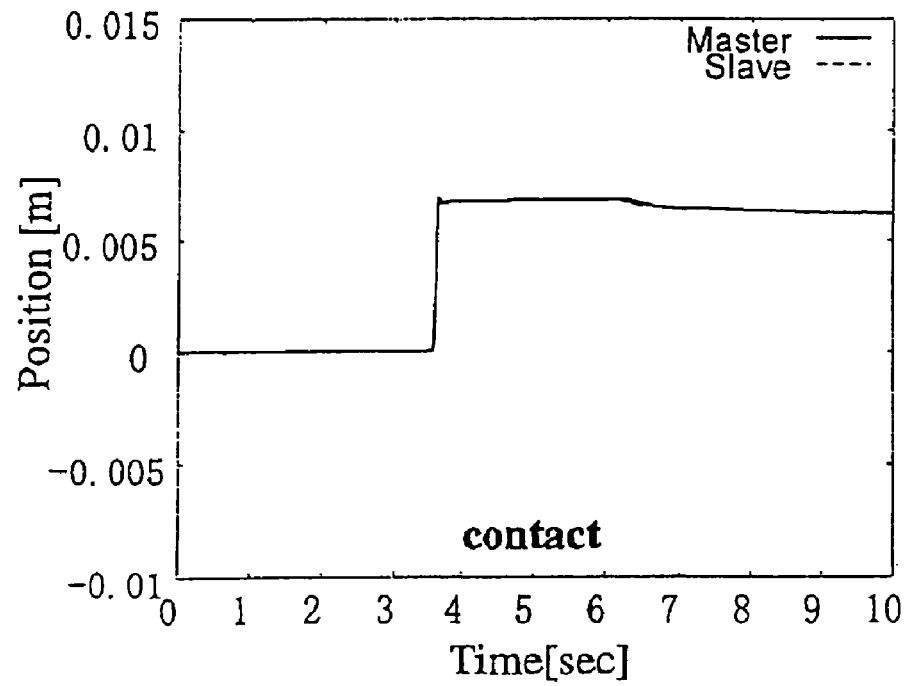
FIG. 10 is a chart illustrating response characteristic (position) of a control device of the present embodiment.
Figure 11:
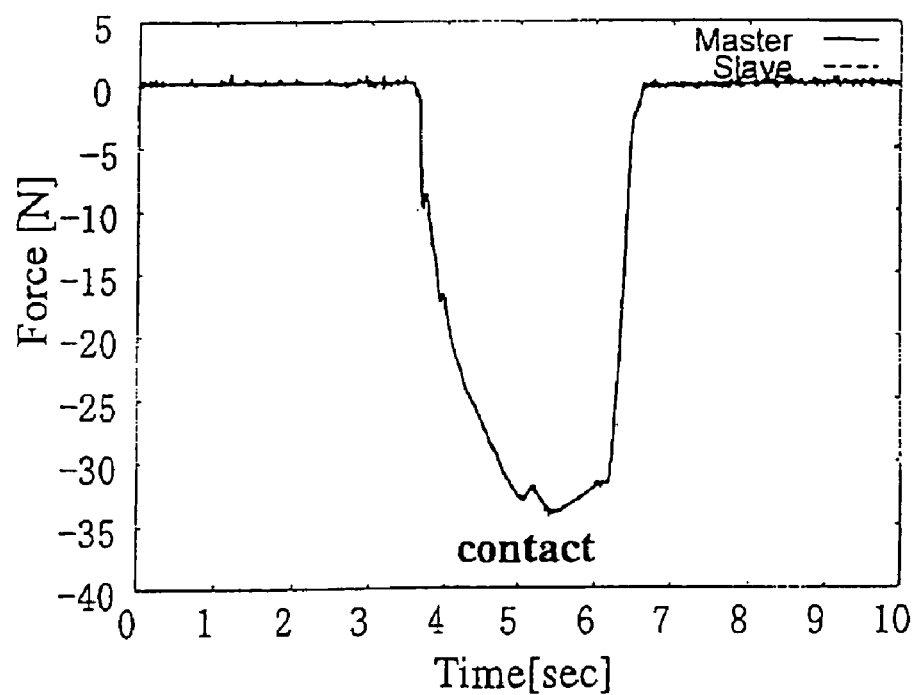
FIG. 11 is a chart illustrating response characteristic (force) of the control device of the present embodiment.

FIGS. 10, 11 illustrate the experimental results. The abscissa in the figures is time (sec), and the ordinate of FIG. 10 is position and that of FIG. 11 is force (Newton). Response characteristics are shown when position and force are changed stepwise.

Although in the aforementioned conventional bilateral control system position deviation happens upon its making contact with an environment and results in bad position reproduction, in the present invention sampling period of computer is enough shortened to secure a satisfactorily wide frequency band and so to raise a control gain of the position control part 5, the environment was reproduced in real time without causing the position deviation as illustrated in FIG. 10.

Although the embodiment described above refers to the case in which the present invention is applied to the bilateral control, the present invention is applicable not limited to the aforementioned bilateral control but to a control device for controlling the slave side in response to a position command value and a force command value.

Figure 12:
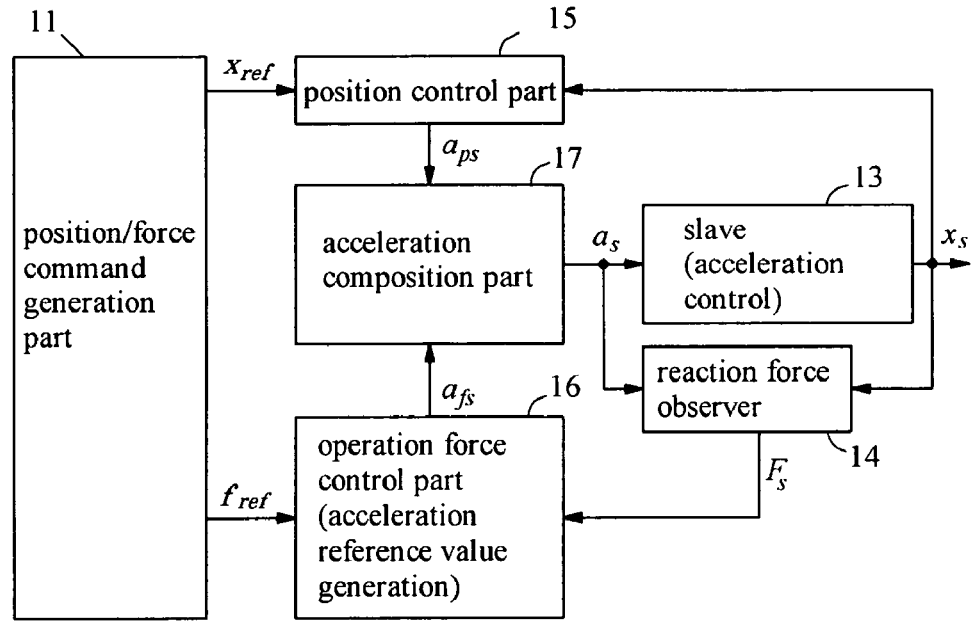
FIG. 12 illustrates a schematic constitution of a position/force control device of a second embodiment of the present invention.

Referring to FIG. 12, there is illustrated a schematic constitution of a position/force control device of a second embodiment of the present invention for controlling the slave side in response to the position command value and the force command value as described above.

In the same figure, designated at 11 is a position/force command generation part for generating a position command value and a force command value, where a position command value $x_{ref}$ outputted by the position/force command generation part 11 is given to the position control part 15 and a force command value $f_{ref}$ is given to the operation force control part 16.

Designated at 13 is a slave operated in response to the position command and the force command, which comprises a slave side motor for driving an object and a slave side position detector for detecting the position of the motor. The aforementioned object refers to, for example, an operation part for actually performing works at a remote place such as a hand of a robot for performing various works.

Designated at 14 is a reaction force estimation observer which estimates force applied to the object from an output of the slave side position detector and a driving signal to the slave side as described previously.

The position command value $x_{ref}$ and the position signal $x_s$ of the object detected by the position detector provided on the slave side are sent to the position control part 15 respectively, and the position control part 15 converts the position command value and the position signal to an acceleration reference value $a_{ps}$.

Further, a force command value fref and a force signal $F_s$ of the slave side detected by the reaction force estimation observer 14 of the slave side are sent to the operation force control part 16, and the operation force control part 16 converts the force command value $f_{ref}$ and the force signal $F_s$ to an acceleration reference value $a_{fs}$.

An acceleration composition part 17 composes the acceleration reference value $a_{ps}$ and the acceleration reference value $a_{fs}$, and outputs an acceleration command signal as that becomes a driving signal to the slave motor.

The position command value and the force command value generated by the position/force command generation part 11 are the previously programmed values, which are obtained for example by storing preceding operations or the like by skilled workers.

For example, the bilateral control device described in the previous embodiment is stored with the desired works performed by a skilled worker, and a position $x_m$ (or $x_s$) of the master side (or the slave side) and an output $F_m$ (or $F_s$) of the reaction force estimation observer of the master side (or the slave side) are stored as a position command value and a force command value. The stored position command value and the stored force command value are outputted from the position/force command generation part 11 to control the slave side whereby the work by the skilled worker can be reproduced.

Figure 13:
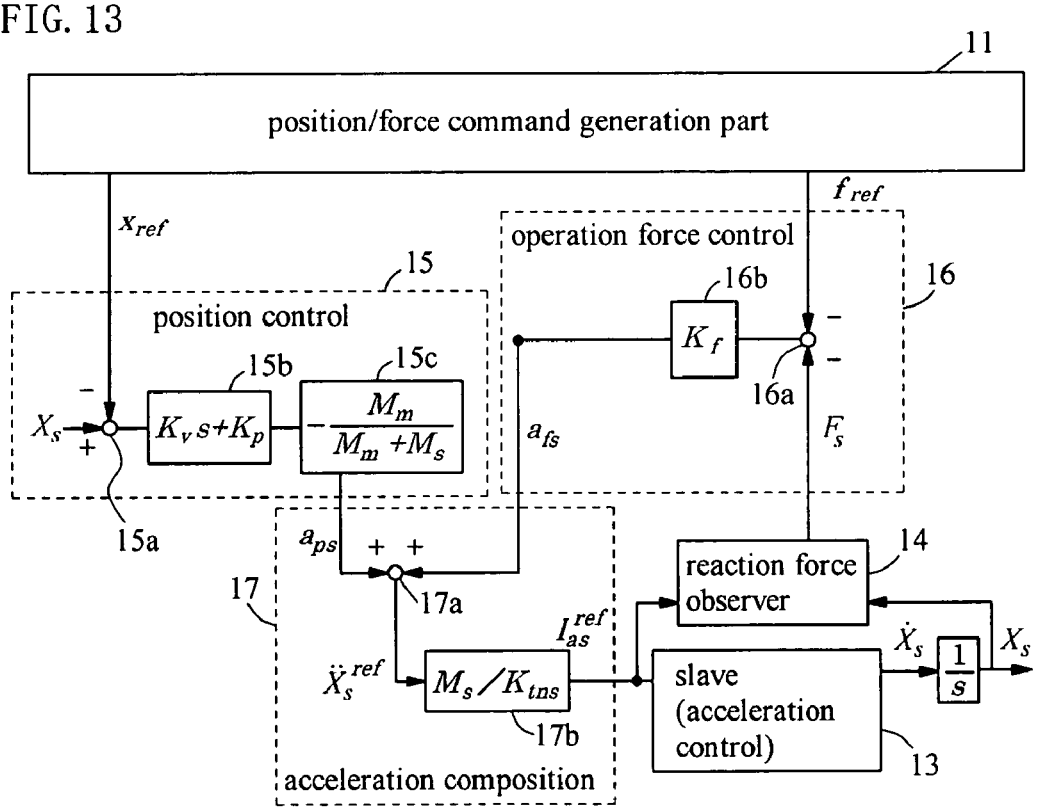
FIG. 13 is a block diagram of a control system of the second embodiment of the present invention.
Figure 14:
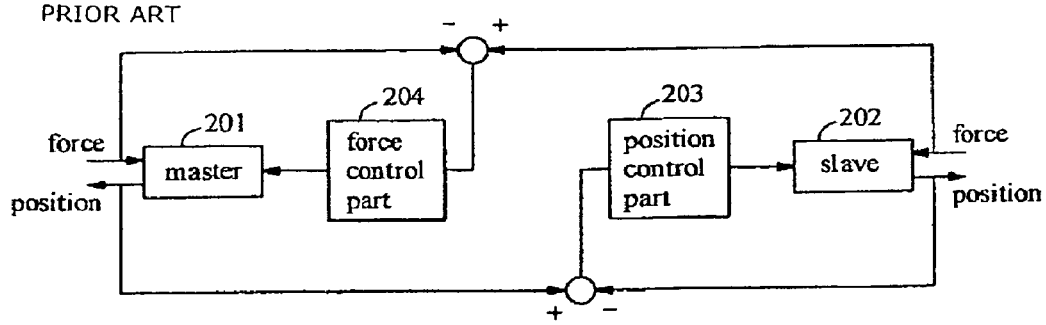
FIG. 14 illustrates an exemplary constitution (1) of a conventional bilateral control system.
Figure 15:
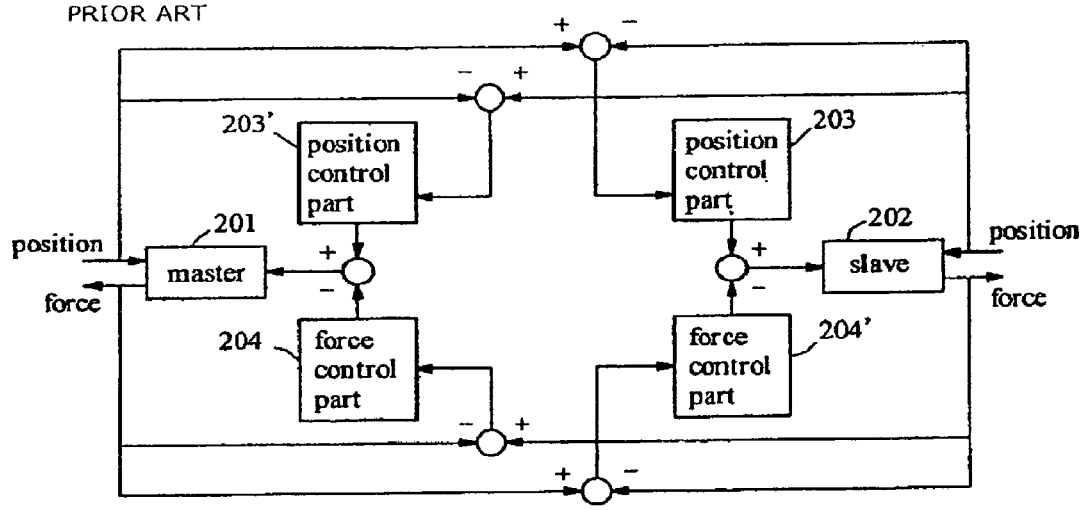
FIG. 15 is a block diagram illustrating an exemplary constitution (2) of the conventional bilateral control system.

Referring to FIG. 13, a block diagram of a control system of the present embodiment is illustrated.

In the same figure, designated at 11 is the position/force command generation part, and 13 is the slave, and further the slave comprises the motor such as a linear motor and a position detector as described previously.

Designated at 14 is a reaction force estimation observer having a constitution illustrated in FIG. 6 and FIG. 9, which estimates an estimated value $F_s$ of the force applied to the slave side from a current signal $I_{as}^{ref}$ supplied to the motor of the slave 13 and from a position detection signal $x_s$ in response to a position detected by the position detector.

Designated at 15 is a position control part, which comprises a subtraction part 15a for estimating a difference between a position command value $x_{ref}$ outputted by the position/force command generation part 11 and a position signal $x_s$ of the slave side detected by the position detector of the slave side; a control part 15b for multiplying an output of the subtraction part 15a by $(K_v s + K_p)$; and a conversion part 15c for generating the acceleration reference value $a_{ps}$. Herein, $K_p$ is a position gain and $K_v$ is a velocity gain.

Designated at 16 is an operation force control part, which comprises a subtraction part 16a for outputting a deviation between a force command value $f_{ref}$ and an estimation value $F_s$ of the force applied to the object of the slave side and outputted by the reaction force estimation observer 14; and a conversion part 16b for generating the acceleration reference value $a_{fs}$ by multiplying an output of the subtraction part 16a by a force gain $K_f$. The force gain $K_f$ is a reciprocal number of hypothetical inertia as described previously and can be properly set to an arbitrary value to reduce the apparent equivalent mass.

Designated at 17 is an acceleration composition part, which comprises an addition part 17a for adding the acceleration reference values $a_{ps}$, $a_{fs}$ to output an acceleration reference value $(x_s^{ref})''$ of the slave side; and a conversion part 17b for generating a current reference value $I_{as}^{ref}$ to drive the motor of the slave side by multiplying an output of the addition part 17a by $[M_s/K_{tms}]$. Herein, $M_s$ is inertia of the slave side and $K_{tms}$ is a slave torque constant.

In the following, there will be described the operation of the control device of the present embodiment illustrated in FIG. 13.

A position command value $x_{ref}$ outputted by the position/force command generating part 11 and the output of the position detector 3a of the slave side are sent to the position control part 15, which generates and outputs the acceleration reference value $a_{ps}$ on the basis of a deviation therebetween.

In contrast, the operation force control part 16 estimates the deviation between the force command value $f_{ref}$ outputted by the position/force command generation part 11 and the force $F_s$ which is imposed on the slave side and is outputted by the reaction force estimation observer 4, and generates and outputs the acceleration reference value $a_{fs}$ from the deviation.

The acceleration reference value $a_{ps}$ and the acceleration reference value $a_{fs}$ are sent to the acceleration composition part 17, which in turn generates the current reference value $I_{as}^{ref}$ from the sum of the acceleration reference value $a_{ps}$ and the acceleration reference value $a_{fs}$.

The current reference value $I_{as}^{ref}$ is given to the motor of the slave side to drive the motor.

When the position command value $x_{ref}$ changes, a position error with the position of the motor of the slave side occurs, and a driving signal to correct the position error is given to the motor of the slave side from the acceleration composition part 17 to drive the motor of the slave side.

Hereby, the system is controlled such that the position of the slave side is coincident with the foregoing position command value.

Simultaneously with this, the force $F_s$ applied to the slave side is estimated by the reaction force estimation observer 4, and the acceleration reference value $a_{fs}$ in response to the deviation between the force command value $f_{ref}$ and $F_s$ is given to the acceleration composition part 17.

The acceleration composition part 17, when magnitudes of the force command value $f_{ref}$ and the force $F_s$ of the slave side are different, gives such a driving signal that the magnitudes are coincident with each other to the motor of the slave side. Hereby, the system is controlled such that the force applied to the slave side is coincident with the force command value $f_{ref}$.

In the present embodiment, as described above, the position detection means for detecting the position of the object of the slave side is provided and the reaction force estimation observer estimates reaction force undergone by the object on the basis of an output of the position detection means. Accordingly, it is possible to inexpensively estimate the reaction force applied to the object of the slave side without being influenced by signal noise and the natural frequency of the sensor itself, and sensor inertia same as in the first embodiment. It is also possible to limit the influence of Coulomb friction and viscous friction coefficient to a minimum.

For this, provided that a high precision sensor is employed as the position detection means, a position detection result is sampled with a relatively short period, and a control gain of the position control part is set to be large, it is possible to control the position and the force of the slave side with good response without causing any position error.

The position control part 15 and the operation force control part 16 are provided, and the acceleration composition part 17 composes the acceleration reference values generated by the position control part 15 and the operation force control part 16 to drive the object of the slave side. Accordingly, it is possible to independently set the gain of the position control and the gain of the operation force control likewise the first embodiment.

INDUSTRIAL AVAILABILITY

The present invention is applicable to various fields such as medical services, working robots for construction, food processing and food handling, assembling, and operations of musical instruments. Moreover, when it is applied to the bilateral control system, operation force of the master side can be transmitted to the slave side with good response, while force applied to the slave side can be transmitted to the master side with good response as well, resulting in ensuring performance of a delicate work realized.

For example, if the present invention is applied to remote controlling of a forceps or the like in the medical care field, it is possible to transmit delicate feel-of-the-touch information to the operator, which is not possible in a conventional remote operation, As it is possible for a surgeon to use it as if he directly operates it with his hand, it is also possible to undertake a manipulation which requires delicate feel-of-the-touch information from a remote place.

Further, if it is applied to working robots for construction, a work of cement application for example can be achieved as if the cement is applied directly by a skilled worker even in the field of handling, assembling, operation or the like, such works or operations can be achieved as if they are done by human experts.

What is claimed is:

1. A position and force control device, comprising:
   (i) driving means for driving an object based on a driving signal applied thereto;
   (ii) position detection means for detecting the position of the object to output a position signal;
   (iii) reaction force detection means for estimating a reaction force which the object receives, where the reaction force is calculated based on a the detected position signal outputted from the position detection means and a the driving signal applied to the driving means; and
   (iv) control means for calculating a first acceleration signal from the reaction force calculated by the reaction force detection means and a goal force signal, and further calculating a second acceleration signal from the position signal and a goal position, and outputting an acceleration control signal based on said first and second acceleration signals to said driving means.

2. The position and force control device of claim 1, wherein the reaction force detection means comprises at least two reaction force estimation observers, wherein the reaction force estimation observers calculate reaction forces based on the driving signal and the position signal.

3. The position and force control device of claim 1, wherein the reaction force detection means subtracts both frictional force and inertia variation's force on the object, respectively as known values, when the reaction force is calculated.

4. A position and force control device for controlling a position of an object and force on the object in response to a position command signal and a force command signal, comprising:
   (i) driving means for driving the object based on a driving signal applied thereto;
   (ii) position detection means for detecting the position of the object to output a position signal;
   (iii) reaction force detection means for estimating a reaction force undergone by the object, where the reaction force is calculated based on a the position signal outputted from the position detection means and the driving signal applied to the driving means;
   (iv) first calculation means for calculating a first difference between a the position command signal and the position signal outputted by the position detection means and converting the first difference to a first acceleration signal;
   (v) second calculation means for calculating a second difference between the reaction force calculated by the reaction force detection means and the force command signal, and converting the second difference to a second acceleration signal; and
   (vi) control means for adding the said first and second acceleration signals and outputting an acceleration control signal based on said first and second acceleration signals, to said driving means.

5. The position and force control device of claim 4, wherein the reaction force detection means comprises at least two reaction force estimation observers, wherein the reaction force estimation observers calculate reaction forces based on the diving signal and the position signal.

6. The position and force control device of claim 4, wherein the reaction force detection means subtracts both frictional force and inertia variation's force on the object, respectively as known values, when the reaction force is calculated.

7. A position and force control device for controlling positions of an object on a slave side and of an operation part on a master side in response to a position difference between the operation part on the master side and the object on the slave side, and driving the object in response to an operation force on the master side, and further transmitting a reaction force on the slave side to the master side, comprising:

(i) first driving means for driving the operation part on the master side based on a first driving signal applied thereto;
(ii) first position detection means for detecting a first position of the operation part on the master side to output a first position signal;
(iii) first reaction force detection means for estimating a first reaction force acting on the operation part to output a first estimated value, where the first reaction force is calculated based on the first position signal outputted from the first position detection means and the first driving signal applied to the first driving means;
(iv) second driving means for driving the object on the slave side based on a second driving signal applied thereto;
(v) second position detection means for detecting a second position of the object on the slave side to output a second position signal;
(vi) second reaction force detection means for estimating a second reaction force undergone by the object to output a second estimated value, where the second reaction force is calculated based on a the second position signal outputted from the second position detection means and a the second driving signal applied to the second driving means;
(vii) first calculation means for calculating a difference between the first position signal outputted by the first position detection means and the second position signal outputted by the second position detection means, and converting the difference to a first acceleration signal and a second acceleration signal;
(viii) second calculation means for calculating a sum of the first estimated value and the second estimated value respectively outputted from the first and the second reaction force detection means, and converting the sum to a third acceleration signal and a fourth acceleration signal;
(ix) first addition means for adding the first acceleration signal and the third acceleration signal to output a first added value;
(x) second addition means for adding the second acceleration signal and the fourth acceleration signal to output a second added value;
(xi) first control means for outputting a first generated acceleration. control signal to the first driving means on the master side, based on the first added value outputted from the first addition means; and
(xii) second control means for outputting a second generated accelerated control signal to the second driving means on the slave side, based on the second added value outputted from the second addition means.

8. The position and force control device of claim 7, wherein the first and second reaction force detection means each comprise a force estimation observer that calculates reaction forces based on the first driving signal and the first position signal or the second driving signal and the second position signal respectively.

9. The position and force control device of claim 7, wherein the first reaction force detection means subtracts both frictional force and inertia variation's force on the operation part on the master side, respectively as known values, when the first reaction force is calculated, and the second reaction force detection means subtracts both frictional force and inertia variation's force on the object on the slave side, respectively as known values, when the second reaction force is calculated.

* * * * *